Patented Aug. 13, 1929.

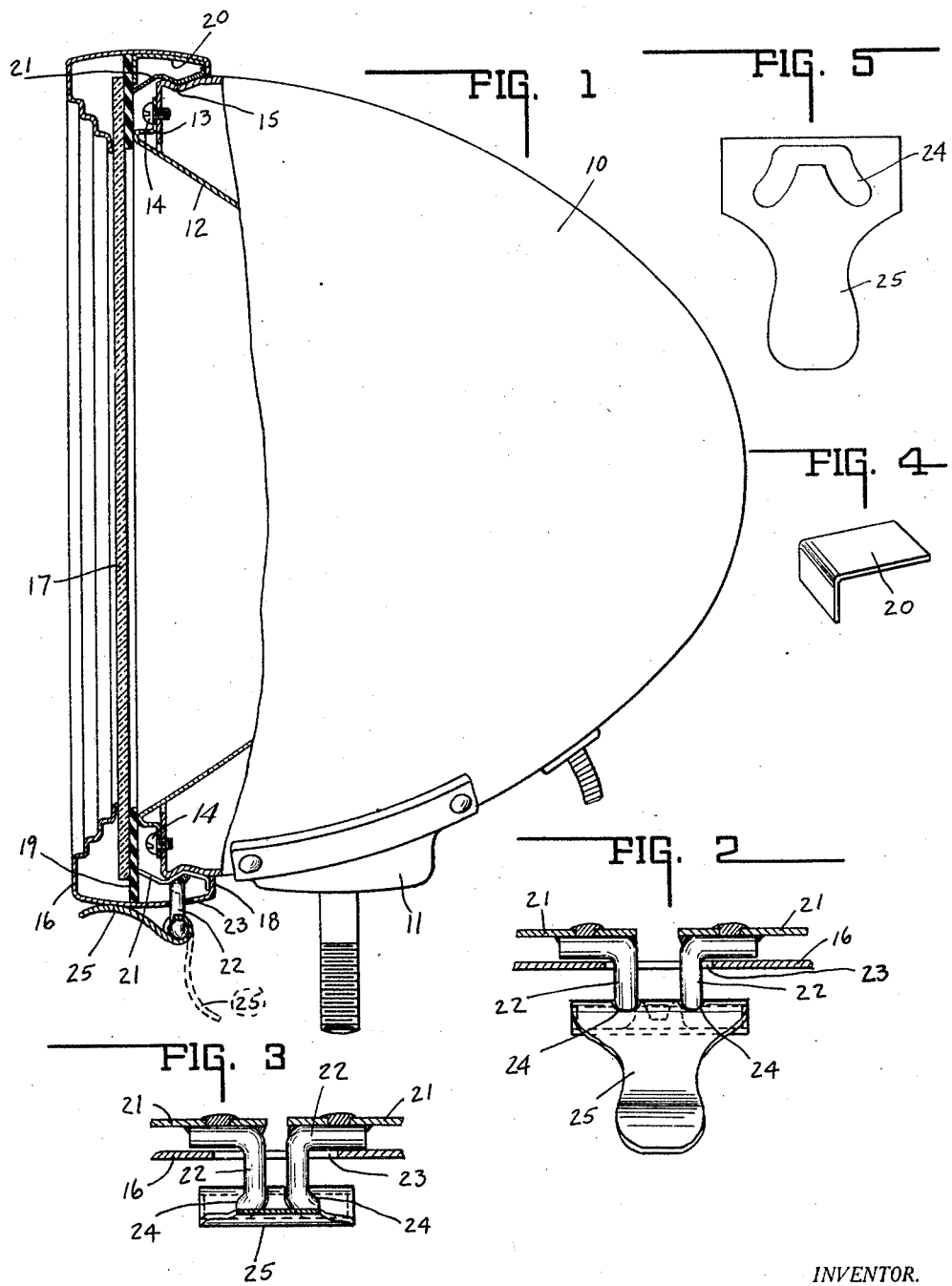

1,724,201

UNITED STATES PATENT OFFICE.

SAMUEL W. HYATT, OF CONNERSVILLE, INDIANA, ASSIGNOR TO INDIANA LAMP CORPORATION, OF CONNERSVILLE, INDIANA.

LAMP CONSTRUCTION.

Application filed May 19, 1928. Serial No. 279,048.

This application relates to the construction of an automobile lamp, and particularly with respect to the securing of the door closure upon the lamp casing.

In the manufacture of automobile lamps, there has been difficulty in providing a suitable structure for removably securing and locking the door closure or lens and rim to the casing so as to permit ready access to the interior thereof while at the same time effectively sealing the interior from the elements and obtaining a construction which will be simple and economical to produce.

It is the object of this invention to obtain the desired results by means of an internal clamping ring contained within the door closure or rim and adapted to clamp about the periphery of the casing for removably securing the closure and casing together while at the same time holding the lens in position for effectively sealing the interior of the lamp and obtain the clamping by a latch pivotally mounted and positioned externally of the closure for effecting a cam action with respect to the split ends of the clamping ring for moving it in and out of clamping engagement.

The full nature of the invention will be more clearly understood from the accompany drawings and the following description and claims.

Fig. 1 is a side elevation of an automobile lamp showing a forward portion thereof in central vertical section with the door closure clamped thereon. Fig. 2 shows a section of the door rim and clamping ring with the latch moved to open position. Fig. 3 is the same as Fig. 2 showing the latch moved to closed position. Fig. 4 is a perspective view of one of the lens securing clips. Fig. 5 is a development of the latch illustrating the cam slots formed therein.

In the drawings there is shown a lamp casing or housing 10 provided with the usual supporting bracket 11 and containing a reflector 12. Said casing is provided with an inwardly extending flange 13 about the forward edge thereof to which the reflector is removably secured by the screws 14. Surrounding the open face of the casing adjacent the flange 13 there is an annular and inwardly formed groove 15.

The closure for the casing comprises the door rim 16 within which is mounted the lens 17. Said rim is provided about its rear edge with an inwardly extending flange 18 so that when it is mounted in place as illustrated, said rim extends over the recess 15 of the casing and the flange 18 engages about the outer surface thereof. The lens is held within the rim by means of a flat fibrous cushioning and sealing ring 19 by means of the spring clips 20. Said clips are positioned within the door rim so as to exert a spring pressure between the flange 18 thereof and the sealing ring 19 for resiliently pressing the lens against the abutting edge of the door rim.

The spring clamping ring 21 is mounted within the door rim so as to extend about and adjacent the inner periphery thereof. Said clamping ring is so formed as to maintain a snug fit between the flange 18 and the sealing ring 19 so as to resiliently bear against said sealing ring throughout the entire length thereof. Inasmuch as there are provided only a few of the clips 20, the split clamping ring 21 further acts to exert a spring sealing pressure against the sealing ring 19 for holding the lens in position. Said ring is also formed to seat about the annular recess 15 and engage therein.

At the split ends of said ring there are secured a pair of oppositely disposed projecting pins 22 which extend through an elongated slot 23 formed in the door rim 16. Said pins have outwardly projecting free ends and extend through the cam slots 24 formed in the latch member 25, said latch member being formed to pivot and swing about the outwardly projecting free ends of said pins.

In operation, the latch 25 is swung about the ends of the pins 22 to the position shown in Fig. 2. This action forces said pins apart which spreads the split clamping ring 21. This enables the door rim to be readily mounted in closing position over the open end of the casing 10. When so mounted, the clamping ring seats in the annular recess 15. Thereupon, the latch 25 is swung about its pivotal mounting on the pins to a position shown in Figs. 1 and 3. The action of the cam slots upon the pins draws them together which acts to draw the split clamping ring tightly about the casing seated in the groove. Thus, the door rim in which the split clamping ring is mounted is firmly secured to the casing and the excess tension exerted upon the split ring causes the outward spreading of that portion thereof which engages the sealing ring 19 so as to yieldingly force said ring and lens in sealing contact with the adjacent edge of the door rim. When it is desired to remove the door for obtaining access to the interior of the casing, the latch is swung rearwardly into the position shown in dotted lines in Fig. 1 as shown in Fig. 2, which acts to again spread the split ring so that it may be readily disengaged from its sealing position in the recess 15. This frees the door rim from the casing so as to permit its ready removal with the lens carried thereby.

While the latch is shown herein with a pair of cam slots extending at an angle to each other, so as to exert a spreading force upon the ring when moved to open position, the intervening portion of the metal in the latch between said slots may be eliminated so that the movement to closed position will force the pins 22 together, as shown in Fig. 3, whereas when said latch is moved to open position the clamping ring will be permitted by the latch to spread or spring apart under its own spring tension.

The invention claimed is:

1. The combination with a lamp casing and a door closing rim adapted to be secured thereto, of means for removably securing said rim to said casing including a split clamping ring secured within said door rim and extending about the periphery of said casing intermediate said casing and door rim, projections on the split ends of said clamping ring extending through an opening in said rim, and a pivotally mounted latch having a cam surface adapted to engage said projecting ends for drawing them together when pivotally moved to one position and thereby clamp the door rim and casing together, and permit the expanding thereof when pivotally moved to the other position for permitting the ready removal of the rim from said casing.

2. The combination with a lamp casing having an annular depression formed thereabout adjacent the face thereof, and a door rim adapted to extend over said depression and spaced therefrom, of means for securing said rim to said casing including a split clamping ring mounted within said rim and adapted to engage about said casing within said recess, projecting ends secured to the split ends of said ring and extending through an opening in said rim, and a pivotally mounted finger engageable and tiltable cam type latch engaging said ends for drawing them together and causing said ring to clamp said rim upon said casing.

3. The combination with a lamp casing and a door closing rim adapted to be secured thereto, of a split clamping ring, projections on the split ends of said clamping ring, and a latch pivotally mounted on said projecting ends and provided with annularly disposed cam slots through which said ends extend whereby said ends will be moved towards or away from each other when said latch is pivotally moved into opposite directions.

In witness whereof, I have hereunto affixed my signature.

SAMUEL W. HYATT.